United States Patent [19]

Saward

[11] Patent Number: 5,537,473
[45] Date of Patent: Jul. 16, 1996

[54] VIDEO RECORDER SYSTEM

[75] Inventor: Ian Saward, Wickford, England

[73] Assignee: Amstrad Public Limited Company, Essex, England

[21] Appl. No.: 438,452

[22] Filed: May 10, 1995

Related U.S. Application Data

[63] Continuation of Ser. No. 178,505, which in a continuation-in-part of PCT/GB92/01239, Jul. 8, 1992, published as WO93/01682, abandoned.

[30] Foreign Application Priority Data

Jul. 8, 1991 [GB] United Kingdom ............... 9114705

[51] Int. Cl.⁶ .................................................. H04N 7/167
[52] U.S. Cl. ........................... 380/16; 380/10; 380/20; 348/3; 348/4; 348/5.5
[58] Field of Search ......................... 380/10, 16, 20, 380/23, 25, 49; 348/3, 4, 5, 5.5

[56] References Cited

U.S. PATENT DOCUMENTS

| | | | |
|---|---|---|---|
| 4,325,078 | 4/1982 | Seaton et al. | |
| 4,823,385 | 4/1989 | Hegendoerfer. | |
| 5,003,384 | 3/1991 | Durden et al. | 348/5.5 X |
| 5,016,273 | 5/1991 | Hoff. | |
| 5,123,046 | 6/1992 | Levine | 380/49 X |
| 5,130,519 | 7/1992 | Bush et al. | 380/50 X |
| 5,144,663 | 9/1992 | Kudelski et al. | 380/16 |
| 5,282,249 | 1/1994 | Cohen et al. | 380/23 |
| 5,329,590 | 7/1994 | Pond | 380/20 |

FOREIGN PATENT DOCUMENTS

| | | |
|---|---|---|
| 0271748 | 6/1988 | European Pat. Off. . |
| 8102961 | 10/1981 | WIPO ........................ 380/20 |
| WO90/03706 | 4/1990 | WIPO . |
| WO90/08442 | 7/1990 | WIPO . |

*Primary Examiner*—David C. Cain
*Attorney, Agent, or Firm*—Flynn, Thiel, Boutell & Tanis

[57] ABSTRACT

A video recorder system adapted to receive subscription television services is of the type which controls access to the subscription services by means of a smart card. Where payment is due for each program received, the viewer is required to make a positive affirmation of purchase by pressing an affirmation button as the program is received. To enable reception in the absence of the viewer by use of the programmer in the recorder, the programmer is provided with means actuable by the viewer when a programmer is being set into the programmer. An indication of whether an affirmation of payment is associated with the program to be recorded is stored in the programmer, and when the program to be recorded is received, automatically authorises the descrambler control circuit, which charges the card and enables the descrambler as though the affirmation button had been pressed.

17 Claims, 3 Drawing Sheets

VIDEO RECORDER SYSTEM

CROSS-REFERENCE TO RELATED APPLICATION

This application is a continuation of U.S. Ser. No. 08/178,505, filed Jan. 7, 1994, now abandoned, which in turn is a continuation-in-part of my International Patent Application No. PCT/GB92/01239, with an international filing date of Jul. 8, 1992, publication No. WO93/01682.

BACKGROUND OF THE INVENTION

This invention relates to a video recorder system.

More particularly, the invention relates to a video recorder system of the type comprising means for receiving an input video signal in scrambled form, a descrambler coupled to the receiving means for selectively descrambling the received video signal to generate a descrambled signal, recording means coupled to the descrambler to record the descrambled signal, and enabling means for enabling the descrambler. The enabling means includes means for reading a portable payment member carrying charging information, and means actuatable by a viewer to confirm a charge operation with respect to the payment member to permit the enabling means to enable the descrambler. The video recorder system also comprises programmer means programmable by a viewer to store data concerning a program to be received at a future time and operative when the program is received to activate the recording means.

Such a system is constituted by a video recorder adapted to receive so-called pay TV (television) or subscription television services to be broadcast by satellite TV systems for reception on satellite TV receivers. It is intended that pay TV systems, such as those known by the trade marks Videocrypt and Eurocrypt, should make use of smart cards to control access to services. A smart card is a plastics card the size of an ISO credit card but carrying an integrated circuit embedded within it. These systems may allow payment either by subscription, or by payment per event, or by tokens, namely time credited into the card. Payment by event or by tokens requires the viewer to make a positive affirmation of purchase each time a program requiring payment is viewed. This affirmation or confirmation may be achieved by pressing a specified button or sequence of buttons.

I have appreciated that while such a system is fine for a television receiver, it has a serious drawback for video recorders. Typically video recorders may be programmed to record a program at a future time. Information concerning the start time and stop time (or duration) of the program and the television channel are set into a timer by the viewer, and will turn on the recorder at the specified time to record the program. Alternatively a program code may be stored and compared with program codes transmitted with the television signal. Such timers are well-known in the context of video cassette recorders and are included in some satellite TV receivers. The timers can be set by a hand-held remote control or directly on the recorder unit.

However I have appreciated that such a system can not be used to record a program for which payment by event or payment by tokens is required, because such programs require affirmation of payment as the program is transmitted, and a major purpose of a video recorder is that it records programs when the viewer is absent and thus is unable to make the necessary affirmation of payment.

PRIOR ART

U.S. Pat. No. 4,823,385 to Hegendörfer describes a "Pay Per View" television system, and refers to an earlier U.S. Pat. No. 4,325,078. Hegendörfer describes a video recorder system decoder which includes a real-time clock. The video signal is transmitted with coded information comprising a source time signal and a time interval signal. The source time signal is compared with the real time signal, and only if the real time is within the time interval is the received signal decoded.

U.S. Pat. No. 5,016,273 to Hoff describes a dual communication mode video tape recorder or video cassette recorder (VCR). The VCR is programmable, but the programmed times are lost or are erroneous in the event of a power interruption. To overcome this and other problems, a separate point-to-point communication device is provided in association with a television receiver and a video tape recorder.

International Patent Application Publication No. WO90/03706 describes a television system in which an encrypted indicating signal is transmitted which indicates whether the transmitted signal contains program or non-program (e.g. commercial) material. The indicating signal can be decrypted at a receiver associated with a VCR and enables editing of the television signal to remove the non-program material for so long as credit remains in a credit store.

SUMMARY OF THE INVENTION

It is an object of this invention to provide a video recorder system which will enable the recording of scrambled signals, which would normally require an affirmation of payment by the viewer, to be recorded even when the viewer is absent.

In the present invention a video recorder system adapted to receive subscription television services is of the type which controls access to the subscription services by means of a smart card. Where payment is due for each program received, the viewer is required to make a positive affirmation of purchase by pressing an affirmation button as the program is received. To enable reception in the absence of the viewer by use of a programmer in the recorder, the programmer is provided with means actuable by the viewer when a program is being set into the programmer. An indication of whether an affirmation of payment is associated with the program to be recorded is stored in the programmer, and when the program to be recorded is received automatically authorises the descrambler control circuit, which charges the card and enables the descrambler as though the affirmation button had been pressed.

BRIEF DESCRIPTION OF THE DRAWINGS

The invention will now be described in more detail by way of example with reference to the drawings, in which.

DETAILED DESCRIPTION OF THE PREFERRED EMBODIMENT

Figure 1:
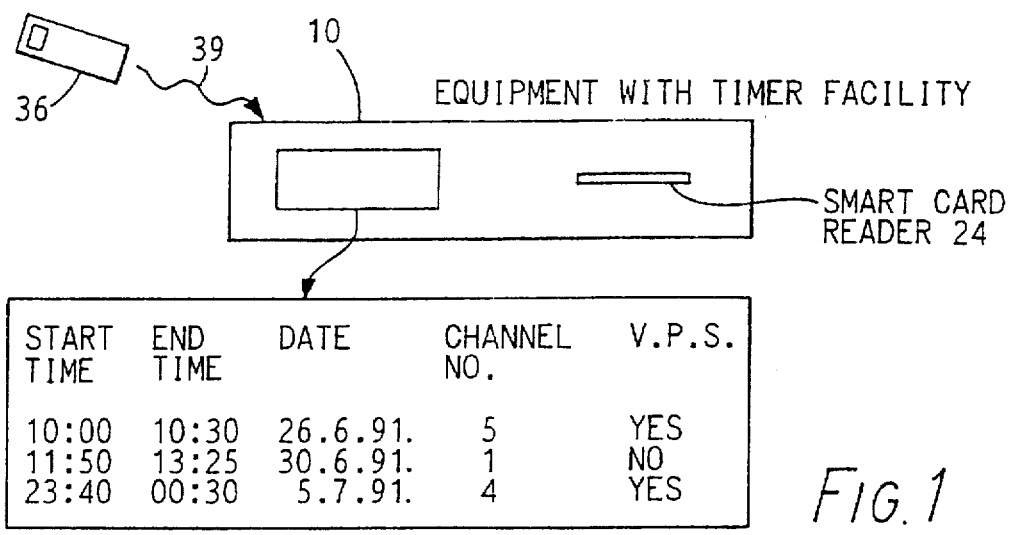
FIG. 1 is a very diagrammatic drawing showing a video recorder system.
Figure 2:
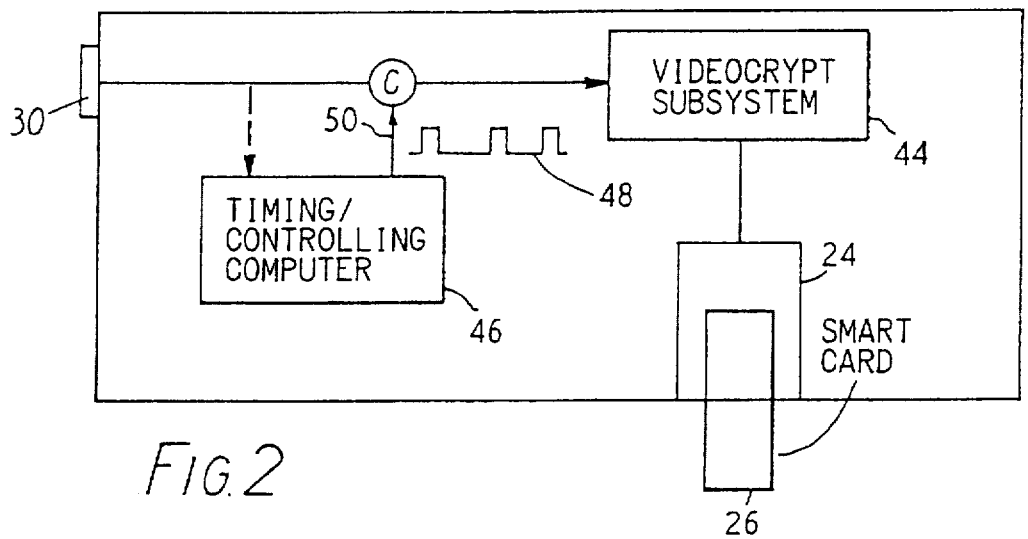
FIG. 2 is a block diagram showing the main components of the control circuits for the recorder.
Figure 3:
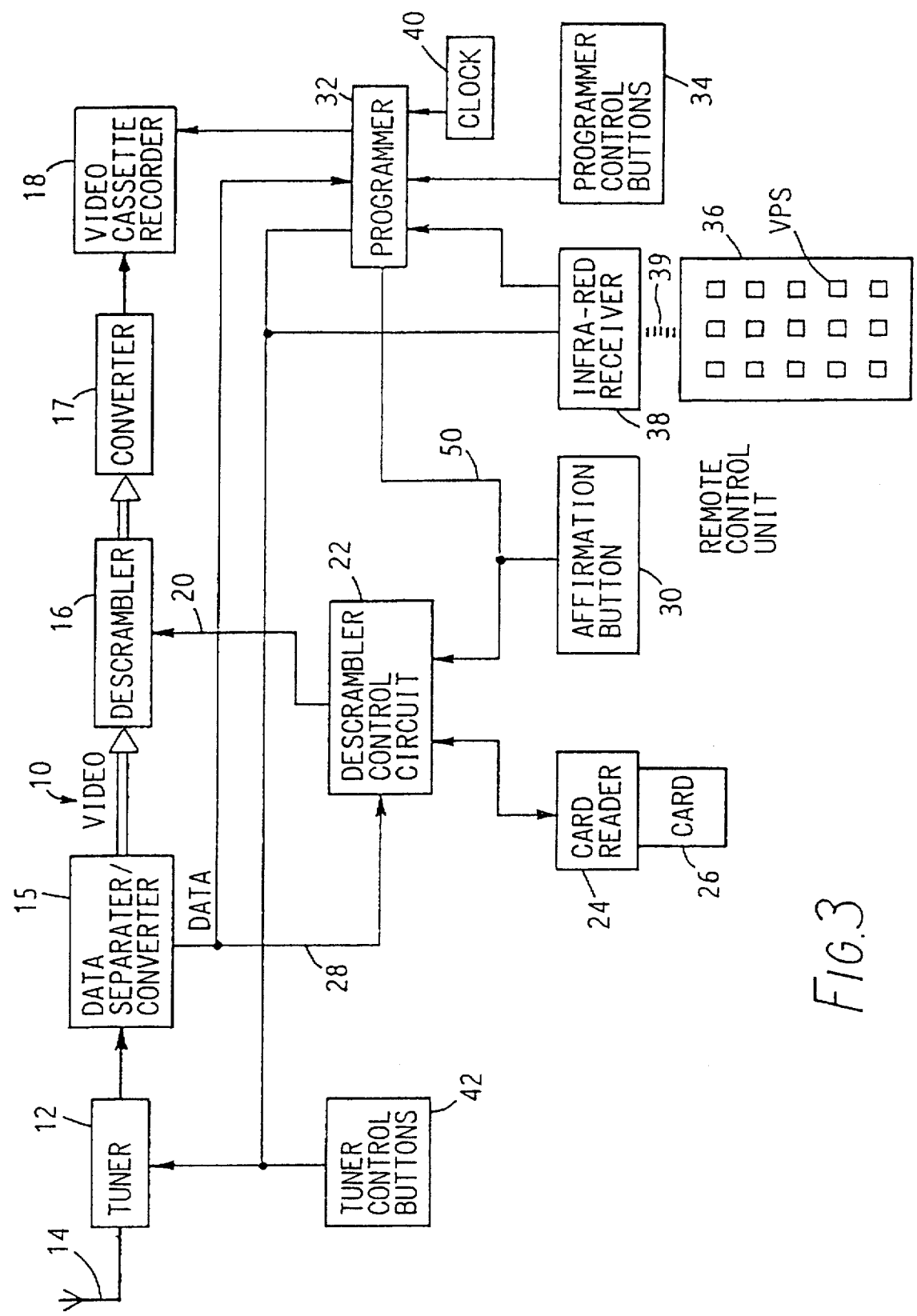
FIG. 3 is a slightly more detailed block diagram of one possible implementation of the system.

The video recorder system 10 illustrated in FIGS. 1 to 3, and more particularly FIG. 3, includes a tuner 12 for connection to a receiving antenna 14 in the form of a satellite dish. The tuner includes necessary down-conversion circuitry of known type. A data separator/converter 15 receives the output of the tuner and separates it into a video signal and a data signal. The video output of the circuit 15 is applied to a descrambler 16 which supplies a descrambled signal through a converter circuit 17 to a video cassette recorder unit 18. The received signal is, or has programs which are, scrambled, such as by the so-called active line rotation method or line shuffling method. The descrambler 16 has a control input 20 from a descrambler control circuit 22. This is coupled to a card reader 24 for reading a smart card 26 carrying charging information. The card may carry an indication that a subscription has been paid for some or all programs, or a credit amount which is debited as viewing takes place, or a total indicating the accumulated charge for programs viewed. The descrambler control circuit 22 receives the data output 28 from the circuit 15 containing information which is compared with information in the circuit 22 or derived from the card. More particularly the data may include a key which is used in a decryption operation in circuit 22 to provide a descrambling key for the descrambler. The data in circuit 22 or on the card 26 may be updated "off-air" by the transmitted data signal. The circuit 22 is also connected to a button 30 which can be actuated by a viewer to affirm a payment operation.

Figure 4:
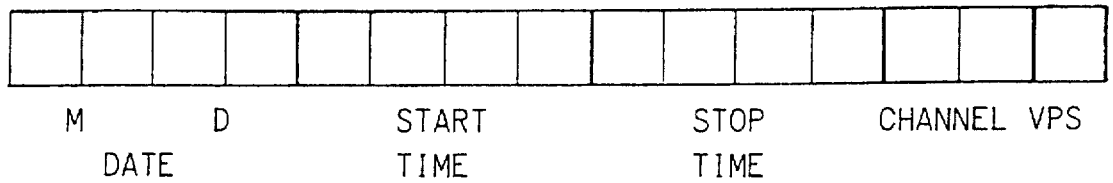
FIG. 4 illustrates one possible form of stored data in the programmer to record a future program.

A programmer 32 is used to store information entered by a viewer as to programs to be recorded at a future time. The information is entered by buttons 34 on the front of the recorder, or via a hand-held remote control unit 36 which communicates with a receiver 38 by an infra-red link 39. The programmer is connected to a clock 40. The information stored may be as indicated in FIG. 4, including the date of the program to be recorded (or a special code indicating "every day" or a specified day of the week), the start time, the stop time and the channel to which the tuner is to be set. Additionally the data includes a VPS (view pay system) code which indicates whether a special VPS button on the remote control unit was pressed when the viewer set the programmer to record this program. This information is stored in the programmer 32.

In the programming operation, the viewer successively enters the data required, including the VPS code if appropriate. Where a remote control is used, the data can be transmitted digit by digit as entered, or can be stored in the remote control and displayed on an LCD display on the control. When all the data has been entered it is then transmitted to the recorder (so-called LCD programming).

The programmer 32 continuously compares the stored start times with the clock output, and when a program is to be recorded, sets the tuner 12 to receive the correct channel. In normal use the tuner can be set by tuner control buttons 42 or by use of the remote control unit. The programmer starts the cassette recorder 18.

Additionally, in accordance with the invention, the programmer 32 sends a signal to the descrambler control circuit 22 mimicking that which it would receive if the affirmation button 30 were depressed at the time when the program was being received. In this way the descrambler is enabled, subject of course to the card permitting reception of this program. The descrambled signal from the descrambler 16 is then converted by the converter 17 into a form suitable for recording, and applied to the recorder 18. The card is meanwhile automatically debited with an amount corresponding to the cost of receiving that program.

In practice the circuits shown in descrambler control circuit 22 and programmer 32 may be constituted by suitably programmed microprocessors. Programmer 32 is constituted by the main receiver microcontroller, which is of known type. The alterations to the programmer which are required in accordance with this invention are very slight and will readily be apparent to those skilled in the art. All that is required is that when an affirmation signal is received as from the remote control unit 36 via the infra-red receiver 38, then the programmer 32 outputs a signal on line 50 which includes a corresponding affirmation signal.

The descrambler control circuit 22 takes the form of a microcontroller as in an existing Videocrypt or similar receiver/recorder. Normally only the affirmation button 30 is connected to the affirmation input of the descrambler control circuit 22, but in accordance with this invention the programmer 32 supplies an output on line 50 which is connected to the affirmation input of the circuit 22. A suitable descrambler control circuit is available from SGS Thomson, France.

The various buttons shown separately in FIG. 3 may in fact be the same buttons operated in different modes, in known manner.

In FIG. 2 the descrambler 16 and descrambler control circuit 22 are shown as a Videocrypt (TM) subsystem 44, and the programmer 32 as a timing/controlling computer 46 which provides pulses 48 on a line 50 to the subsystem 44. The authorise key can be read by the microprocessor 46, or can simply provide a command signal.

In any event it will be seen from the above that when the programmer or timer is set to record a program, an additional step allows the viewer to set the timer into a "view pay system" (VPS) mode to pay for the future program. The special VPS key on the remote control unit is used, and if the VPS flag is set, the stored data is thereby marked to indicate that it concerns a program which is to be paid for when it is received. When the program is received, the timer automatically turns on the recorder, and configures it to select the channel previously defined by the viewer. If the program was marked with the VPS flag, then the payment procedure will be started. The payment method differs depending upon the type of pay TV system used.

With the Videocrypt system, "pay per view" and "pay by time" smart cards may be used in the future. To facilitate payment by either of these cards an authorise key exists, which the viewer presses to confirm payment. In the system described above, the timer microprocessor also has a control of or access to the authorise key, which it pulses for a specified time to confirm payment. The descrambler recognises this and debits the card accordingly.

With the Eurocrypt system, "pay per view", "pay by time" and "pay per program" may all be used in the future. In this case the software performing the timing function usually also has control over the descrambling and payment process. The viewer is generally asked a question such as "Would you like to purchase this program?" if it is pre-booked or available for purchase. There is no dedicated authorise key in a conventional receiver. In the system illustrated, if the timer has had the VPS flag set by depression of the VPS key during the programming operation, the software foregoes this question and automatically debits the card accordingly.

It will be appreciated that while the input signal has been described as received from a satellite, the invention is not limited to such signals and could be used with signals transmitted by other means, such as by cable.

Figure 5:
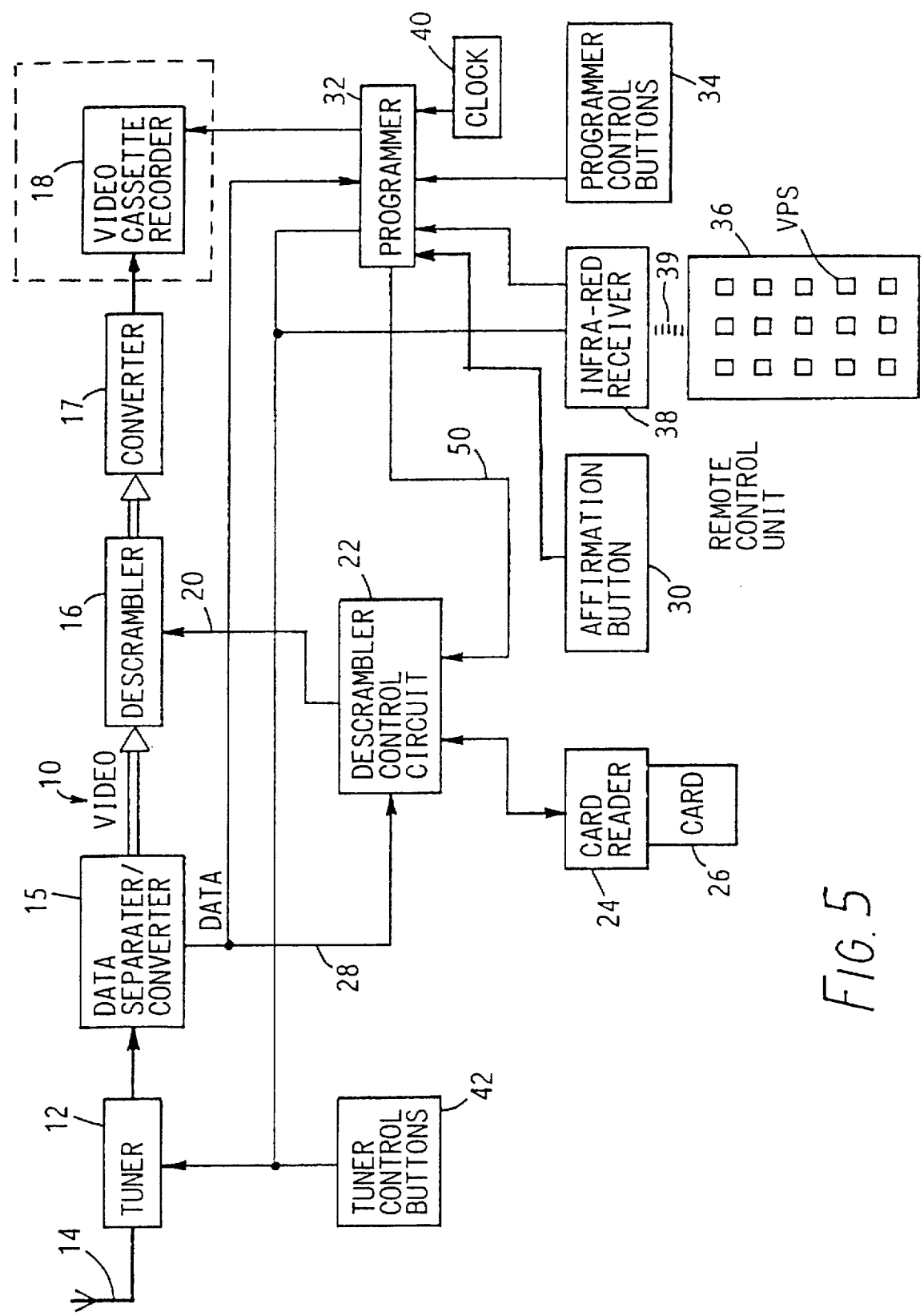
FIG. 5 illustrates a modification of the system of FIG. 3.

A modified system is shown in FIG. 5. Most of the system of FIG. 5 is the same as the system of FIG. 3 and is not therefore described in detail again. However there are the following differences.

First, the affirmation button 30 is not connected to the descrambler circuit 22 direct, but is connected to the programmer 32. Pressing the affirmation button 30 causes the programmer to provide an appropriate affirmation signal in the signal applied over line 50 to the descrambler control circuit 22.

Secondly, in this example the video cassette recorder (VCR) 18 is housed in a separate unit; the rest of FIG. 5 thus constituting a stand-alone satellite decoder unit.

It will be appreciated that various modifications may be made to the systems described and all such modifications are encompassed within the scope of the invention as set forth in the following claims.

I claim:

1. A video signal recording system for recording descrambled video signals, said system including:

a descrambler configured to receive scrambled video signals and to convert the scrambled video signals into descrambled video signals in response to a descrambler-actuation signal;

a recorder connected to said descrambler for receiving the descrambled video signals, said recorder being configured to record video signals including the descrambled video signals in response to a record-actuation signal;

a descrambler enabler connected to said descrambler for transmitting said descrambler-actuation signal thereto, said descrambler enabler having a data reader for receiving a portable data storage element, said data reader being configured to read charge-authorization data from the portable data storage element, said descrambler enabler being configured to receive a charge-enable signal and being configured to selectively generate said descrambler-actuation signal in response to receipt of said charge-enable signal and the charge authorization data read from the portable data storage element; and a programmer connected to said recorder for selectively transmitting said record-actuation signal thereto and to said descrambler enabler for selectively transmitting said charge-enable signal thereto, said programmer having an input device for the entry of user-generated program start time data and user-generated charge-enable data, a memory for storing the program start time data and charge-enable data and a real time clock maintaining a clock time, said programmer being configured to transmit said record-actuation signal based on a correlation of said stored start time data and clock time and to selectively transmit said charge-enable signal in conjunction with said transmission of said record-actuation signal in response to said stored charge-enable data.

2. The video signal recording system of claim 1, wherein said descrambler enabler data reader is configured to read data from a portable card.

3. The video signal recording system of claim 1, wherein the portable data storage element is configured to store data representing available viewing credits and wherein said descrambler enabler is configured to selectively subtract stored viewing authorization credits from the data storage element in response to receipt of said charge-enable signal to transmit said descrambler-actuation signal when the remaining viewing credits stored on the portable data storage element are above a selected minimum amount.

4. The video signal recording system of claim 3, wherein said descrambler enabler data reader is configured to read the stored viewing credits and subtract viewing credits from a portable card.

5. The video signal recording system of claim 1, wherein said descrambler enabler is configured to selectively write on to the data storage element a debit indication each time said charge-enable signal is received.

6. The video signal recording system of claim 2, wherein said descrambler enabler data reader is configured to read data from a portable card and to write said debit indication to the portable card.

7. The video signal recording system of claim 1, further including:

a receiver for receiving a plurality of video broadcast signals including at least one scrambled broadcast signal; and a tuner connected to said receiver for receiving said plurality of broadcast signals, said tuner being configured to selectively transmit one of said broadcast signals to said descrambler in response to receipt of a tuner-select signal, and wherein:

said programmer is further configured to generate said tuner select signal in response to said user generated program commands.

8. The video signal recording system of claim 1, further including a manual charge-enable circuit including a manually actuated charge-enable switch, said manual charge-enable circuit being configured to generate said charge-enable signal to said descrambler enabler in response to actuation of said charge authorization-enable switch.

9. The video signal recording system of claim 8, wherein said manual charge authorization circuit is integrally associated with said descrambler enabler.

10. A video signal processing system for selectively controlling actuation of a video recorder and the recording of descrambled video signals by the recorder, said system including:

a user-controlled programmer having an input device for allowing a viewer to enter program select data indicating programs to be recorded at future times and authorizations to pay for charges associated with recording the programs, a memory for storing said user-generated program data including said user-generated charge authorization data, a clock for maintaining an indication of the real time, said programmer being configured to transmit recorder-actuation signals to the recorder at selected times in response to said program data and the real time, and to selectively generate a charge-enable signal in conjunction with the recorder-actuation signal in response to said user-generated charge authorization data;

a descrambler enabler connected to said programmer for receiving said charge-enable signal, said descrambler enabler having a data reader for reading charge account data from a portable data storage media, said descrambler enabler being configured to selectively generate a descrambler-actuation signal in response to receipt of said charge-enable signal and the charge account data read from the portable data storage element; and a descrambler coupled to receive descrambled video signals, and said descrambler-actuation signal, said descrambler being configured to convert descrambled video signals to descrambled signals suitable for recording by the recorder in response to receipt of said descrambler-actuation signal.

11. The video signal processing system of claim 10, wherein said descrambler enabler data reader is configured to read data from a portable card.

12. The video signal processing system of claim 10, wherein the portable data storage element is configured to store data representing available viewing credits and wherein said descrambler enabler is configured to selectively subtract stored viewing authorization credits from the data storage media in response to receipt of said charge-enable signal to transmit said descrambler-actuation signal when the remaining viewing credits stored on the portable data storage element are above a selected minimum amount.

13. The video signal processing system of claim 12, wherein said descrambler enabler data reader is configured to read the stored viewing credits and subtract viewing credits from a portable card.

14. The video signal processing system of claim 10, wherein said descrambler enabler is configured to selectively write on to the data storage media a debit indication each time said charge-enable signal is received.

15. The video signal processing system of claim 14, wherein said descrambler enabler data reader is configured to read data from a portable card and to write said debit indication to the portable card.

16. The video signal processing system of claim 10, wherein said programmer is further configured to generate a tuner-select signal in response to said the viewer-generated program commands, to store said tuner-select signal and to transmit said tuner select signal to a tuner when transmitting said recording actuation signal.

17. The video signal processing system of claim 10, further including a manual charge-enable circuit including a manually actuated charge-approval switch, said manual charge authorization circuit being configured to generate said charge-enable signal to said descrambler enabler in response to actuation of said charge-approval switch.

* * * * *

UNITED STATES PATENT AND TRADEMARK OFFICE
CERTIFICATE OF CORRECTION

PATENT NO. : 5,537,473
DATED : July 16, 1996
INVENTOR(S) : Ian SAWARD

It is certified that error appears in the above-indentified patent and that said Letters Patent is hereby corrected as shown below:

Column 6, line 67; change "descrambled" to ---scrambled---.

Signed and Sealed this

Third Day of December, 1996

Attest:

BRUCE LEHMAN

Attesting Officer        Commissioner of Patents and Trademarks